United States Patent [19]

Dalrymple et al.

[11] Patent Number: 5,032,982
[45] Date of Patent: Jul. 16, 1991

[54] DEVICE FOR TIMING INTERRUPT ACKNOWLEDGE CYCLES

[75] Inventors: Monte J. Dalrymple, Fremont; Don Smith, Los Gatos, both of Calif.

[73] Assignee: Zilog, Inc., Campbell, Calif.

[21] Appl. No.: 520,850

[22] Filed: May 7, 1990

Related U.S. Application Data

[63] Continuation of Ser. No. 195,517, May 18, 1988, abandoned.

[51] Int. Cl.⁵ .................... G06F 13/14; G06F 13/24
[52] U.S. Cl. .................... 364/200; 364/241.2; 364/240.9; 364/242; 364/271.5
[58] Field of Search ... 364/200 MS File, 900 MS File

[56] References Cited

U.S. PATENT DOCUMENTS

| | | | |
|---|---|---|---|
| 3,656,123 | 4/1972 | Carnevale et al. | 364/200 |
| 3,736,567 | 5/1973 | Lotan et al. | 364/200 |
| 3,736,569 | 5/1973 | Bouricius et al. | 364/200 |
| 4,079,454 | 3/1978 | Sorenson et al. | 364/200 |
| 4,128,892 | 12/1978 | Vasa | 364/900 |
| 4,168,526 | 9/1979 | Auer et al. | 364/900 |
| 4,231,104 | 10/1980 | Clair | 364/900 |
| 4,381,552 | 4/1983 | Nocilini et al. | 364/900 |
| 4,438,490 | 3/1984 | Wilder | 364/200 |
| 4,463,443 | 7/1984 | Frankel et al. | 364/900 |
| 4,481,581 | 11/1984 | Johnson | 364/200 |
| 4,485,457 | 11/1984 | Balaska | 364/900 |
| 4,545,030 | 10/1985 | Kitchin | 364/900 |
| 4,570,220 | 2/1986 | Tetrick et al. | 364/200 |
| 4,591,975 | 5/1986 | Wade et al. | 364/200 |
| 4,631,702 | 12/1986 | Korba | 364/900 |
| 4,695,945 | 9/1987 | Irwin | 364/200 |

*Primary Examiner*—David Y. Eng
*Attorney, Agent, or Firm*—Majestic, Parsons, Siebert & Hsue

[57] ABSTRACT

A peripheral device containing a control circuit with internal timing which enables it to independently adjust the timing of an interrupt acknowledge cycle. The circuit senses a timing signal from the CPU and asserts a control signal to suspend the operation of the CPU for a predetermined period of time. The predetermined period of time is customized to the peripheral so that when the CPU is re-activated and reads from the bus, a valid interrupt vector will have been put out by the peripheral.

2 Claims, 5 Drawing Sheets

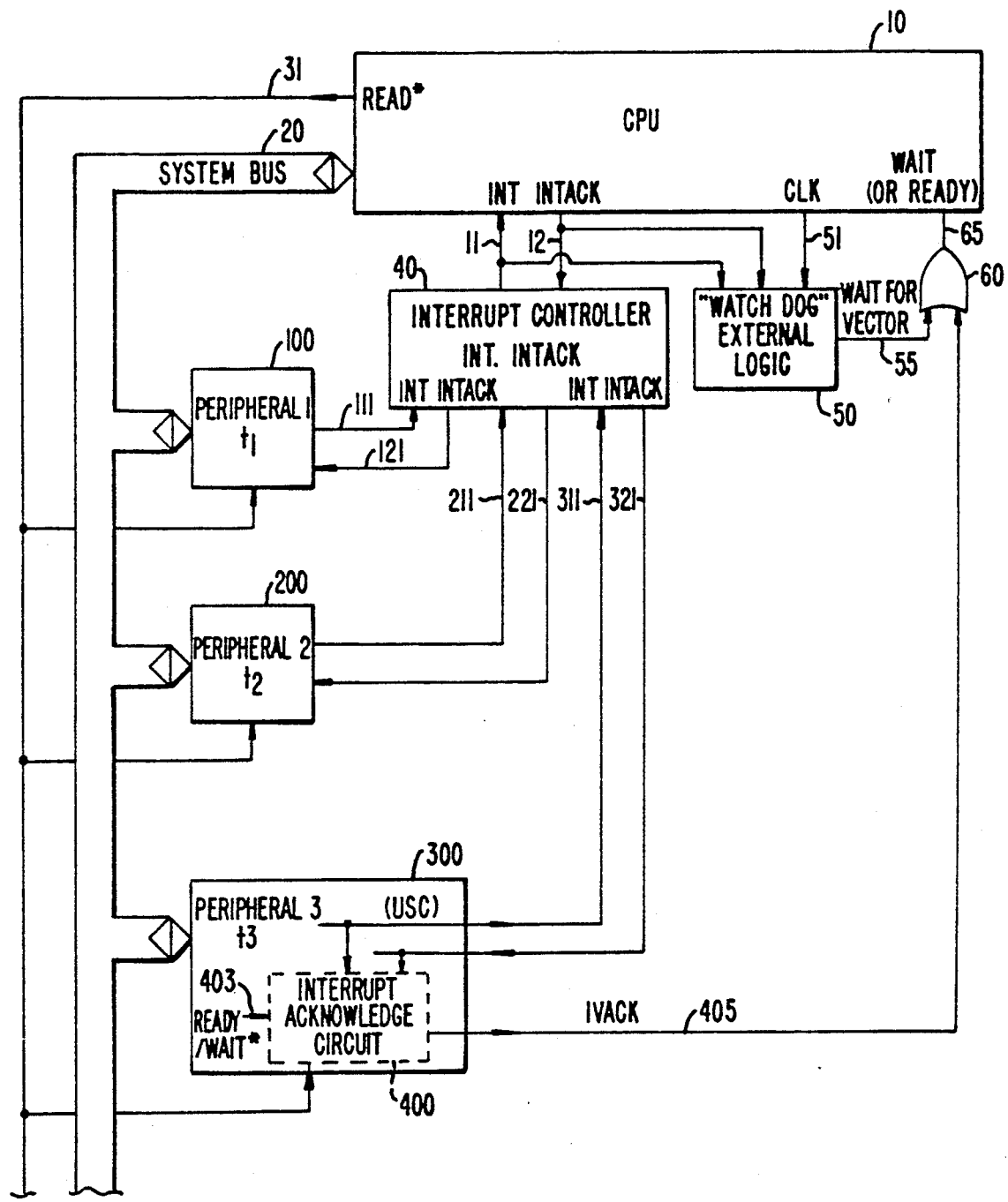
FIG._1.

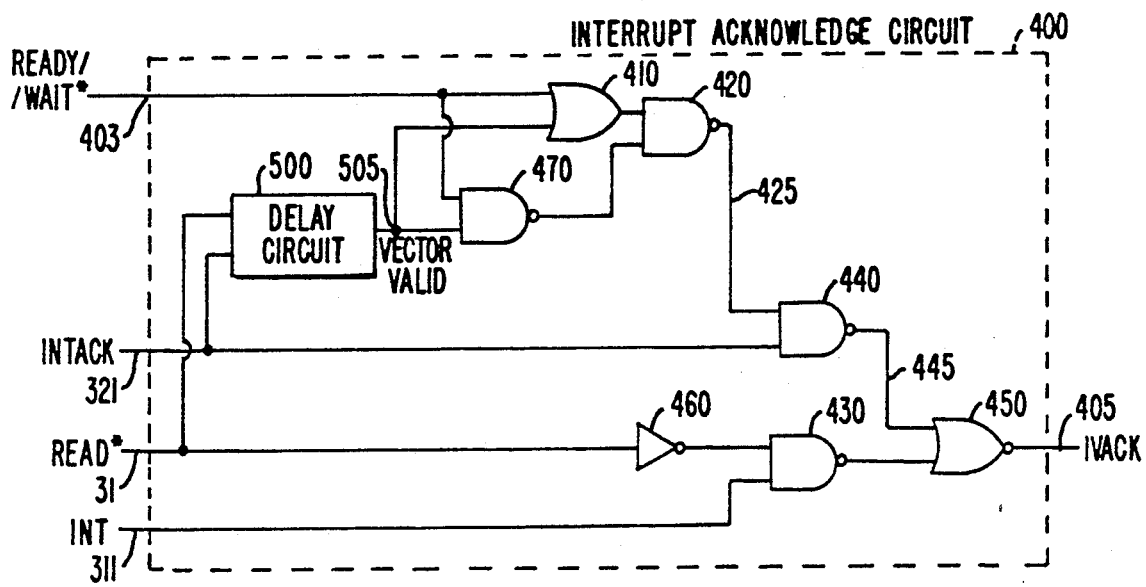
FIG._2.
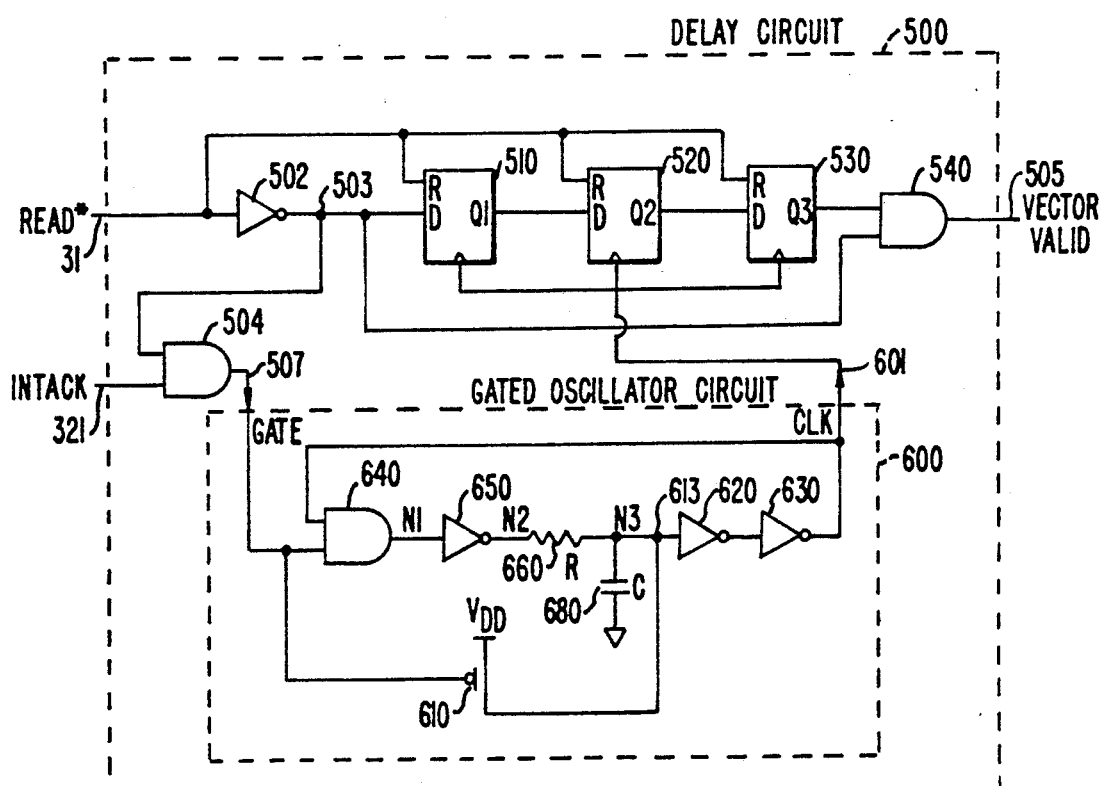
FIG._4.

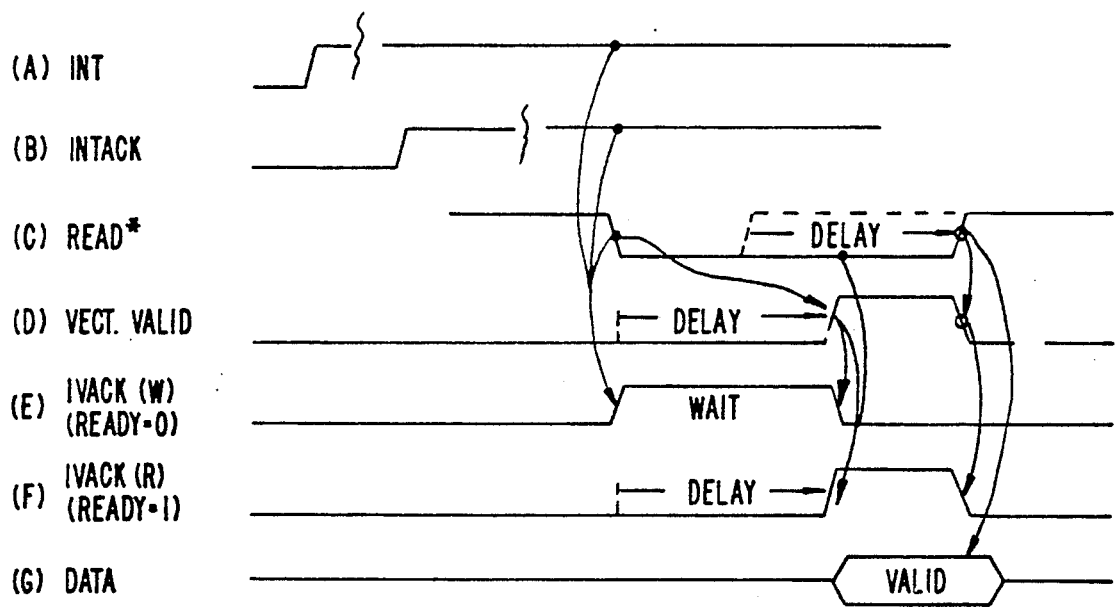
FIG._3.

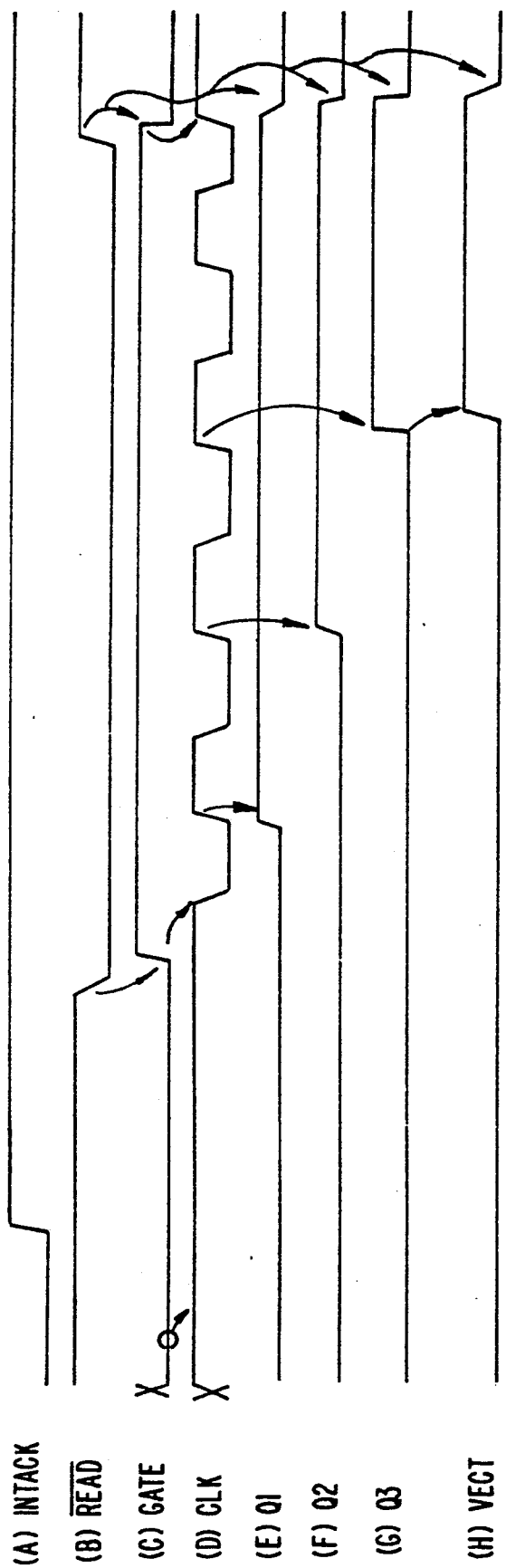

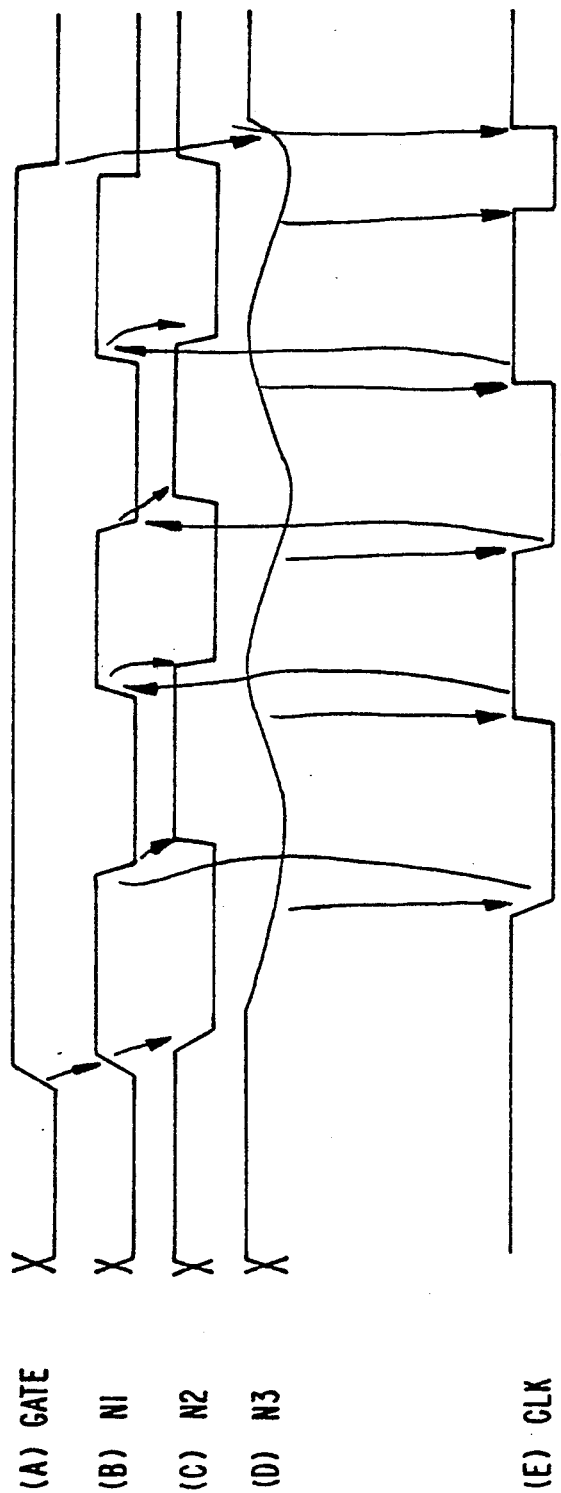
FIG._6.

DEVICE FOR TIMING INTERRUPT ACKNOWLEDGE CYCLES

This is a continuation of application Ser. No. 07/195,517, filed May 18, 1988 now abandoned.

BACKGROUND OF THE INVENTION

This invention relates in general to digital computer systems, and in particular to the ability of a device on a system bus to independently adjust the timing of the interrupt acknowledge cycle.

A computer system usually has a Central Processing Unit (CPU) communicating with a host of peripheral devices through a system bus. To provide interrupt service, the CPU is typically provided with at least a pair of terminals for receiving an interrupt request and for transmitting an interrupt acknowledge.

Any one of the peripheral devices, at any time during its operation may require the attention of the CPU. In particular, one or more interrupt sources within the peripheral could have the peripheral initiate an interrupt cycle by asserting an interrupt request to the CPU. For example, if the peripheral serves as a serial port, one interrupt source could be the Data Carrier Detect (DCD) and another interrupt source could be from the baud rate generator.

When the CPU receives an interrupt request, its first task is to obtain information about which interrupt source made the request and the corresponding address of the appropriate interrupt service to perform. The information is contained in an interrupt vector put out by the peripheral and is fetched by the CPU during an interrupt acknowledge cycle.

After an interrupt request is received, the CPU begins the cycle by issuing an interrupt acknowledge to the peripheral in question. The peripheral, on receiving the acknowledge, determines which of its interrupt sources has made the interrupt request and puts out this information, among other things, in the form of an interrupt vector on the data bus. In the meantime, the CPU issues a read strobe to latch the interrupt vector from the bus and completes the interrupt acknowledge cycle. The length of the interrupt acknowledge cycle is the time interval between the issuance of the interrupt acknowledge and the reading of the interrupt vector. It is generally predetermined for a given CPU.

On the other hand, the peripheral takes a certain amount of time from the reception of the interrupt acknowledge to get the interrupt vector ready on the data bus. Thus, it is essential that the reading is done after the interrupt vector is valid on the data bus. In other words, the timing specification is such that the length of the interrupt acknowledge cycle must be longer than the vector ready time.

The vector ready time is inherently different for different peripheral devices. This is primarily due to the finite time required for signals to settle in the internal device logic which is used to prioritize the different interrupt sources. For example, daisy chain is a common topology employed in prioritizing circuits, and the propagation delays is dependent on the number of links in the chain which in turn is dependent on the number of interrupt sources.

There are two ways of lengthening the interrupt acknowledge cycle so that the timing specification is satisfied. The first way is to program a number of software wait states to delay the read strobe. This has the disadvantage of introducing another possible source of system design error. In any case, most CPU's support only a limited number of software wait states and the method is not applicable to situations where a long delay is required. The second method is to add the wait state by hardware control. A "watchdog" external logic senses the interrupt acknowledge signal and asserts the WAIT input of the CPU for a predetermined time interval so that a number of wait states are inserted. This method has the disadvantage of requiring additional external logic. Another disadvantage is that the timing of the external logic is derived from the system clock, and a change of the system clock necessitates adjusting the timing of the external logic.

In conventional systems, when a number of peripheral devices with differing vector ready times coexist in the same system, the length of the interrupt acknowledge cycle must be determined by the slowest device. In this way, even the worst case situation is also covered. However, this summary approach necessarily puts a penalty on the rest of the peripherals which do not require as long a cycle time. Another disadvantage is that every time a new peripheral is added to the system, its vector ready time must be considered, and if it is slower than all the existing ones, the interrupt acknowledge cycle must be further lengthened to be commensurate with it.

Accordingly, it is a primary object of the invention to allow a peripheral device to indepedently adjust the timing of the interrupt acknowledge cycle.

It is another object of the invention to customize the timing of the interrupt acknowledge cycle to each peripheral.

It is another object of the invention to derive the timing of the interrupt acknowledge cycle by an independent timing circuit within the peripheral device so that the timing is not affected by any change in any external clocks.

SUMMARY OF THE INVENTION

This and additional objects are accomplished by the various aspects of the present invention, wherein, according to one aspect thereof, a circuit within the peripheral detects timing signals issued from the CPU and asserts a control signal to the CPU for a predetermined period of time. The control signal is used to suspend the operation of the CPU. This provides more time for the peripheral to put out a valid interrupt vector to the data bus. At the end of the predetermined period, the control signal is deactivated and the CPU resumes its operation and reads the valid interrupt vector from the data bus. The predetermined period of time is customized to the peripheral and is set by an internal timing circuit.

According to another aspect of the invention, a circuit within the peripheral detects timing signals issued from the CPU and after a predetermined period of time issues a control signal to the CPU. Prior to that, the operation of the CPU has been suspended to allow more time for the peripheral to put out a valid interrupt vector to the data bus. The control signal is now used to reactivate the CPU. The CPU resumes its operation and reads the valid interrupt vector from the data bus. The predetermined period of time is customized to the peripheral and is set by an internal timing circuit.

Additional objects, features and advantages of the present invention will become apparent from the following description of the preferred embodiment thereof, which description should be taken in conjunction with the accompanying drawings.

BRIEF DESCRIPTION OF THE DRAWINGS

FIG. 1 is a block diagram illustrating a microprocessor system with an interrupt acknowledge scheme according to the preferred embodiment of the invention;

FIG. 2 is the circuit diagram for the interrupt acknowledge circuit illustrated in FIG. 1;

FIGS. 3(A)-3(G) are the timing diagrams of the interrupt acknowledge circuit of FIG. 2;

FIG. 4 is the circuit diagram of the delay circuit illustrated in FIG. 2;

FIGS. 5(A)-5(H) are the timing diagrams of the delay circuit of FIG. 4;

FIGS. 6(A)-6(E) are the timing diagrams of the gated oscillator circuit portion of the delay circuit of FIG. 4.

DETAILED DESCRIPTION OF THE PREFERRED EMBODIMENT

FIG. 1 shows in block diagram form a microprocessor system. A Central Processing Unit (CPU) 10 communicates with peripheral 1 100, peripheral 2 200 and peripheral 3 300 via a system bus 20. The vector ready time for peripheral 1, 2 and 3 are respectively T1, T2 and T3. For illustrative purposes, peripheral 1 and peripheral 2 are selected to represent conventional peripheral devices. Peripheral 3 is selected to illustrate the various aspects of the present invention and will be referred to as the Universal Serial Controller (USC). In practice, the CPU may be connected to more or less peripherals but, for simplicity's sake and without loss of generalities, only three peripherals are shown in FIG. 1. The system bus 20 includes address lines, data lines, as well as control lines. However, for illustrative purposes, some of the control lines are drawn explicitly outside the system bus.

The CPU receives interrupt requests through line 11 and issues interrupt acknowledges through line 12. Since the CPU has one pair of interrupt request and acknowledge lines, an interrupt controller 40 is employed to effectively switch the corresponding interrupt lines of the different peripherals to the interrupt lines 11 and 12 of the CPU. The interrupt controller 40 also serves to prioritize the different peripherals when conflicting requests are present. Thus, for example, if peripheral 1 has been assigned higher priority than peripheral 2, the interrupt controller 40 would connect peripheral 1 in favor of peripheral 2 to the CPU in the event both peripherals are asserting interrupt request simultaneously. In this case, the interrupt request signal from peripheral 1 in line 111 will be routed to the input line 11 of the CPU. The CPU returns the acknowledge signal in the output line 12 which will be routed back to peripheral 1 via the line 121. When there is no conflict of interrupt requests from different peripherals, the interrupt controller 40 is essentially transparent to the peripherals and the CPU.

Before the invention is described in detail, a brief discussion of the conventional case absent the USC peripheral 3 is expedient, since one feature of the invention is the ease with which the USC peripheral may be added to an existing conventional system.

Referring to FIG. 1 and ignoring the USC peripheral 3 300 in this instance of the discussion, the conventional system then comprises the CPU and peripheral 1 100 and peripheral 2 200. When one of the peripherals, for example peripheral 1, requires the attention of the CPU 10, it will issue an interrupt request along line 111. The interrupt controller 40 routes this request to the CPU via line 11. The CPU will return an interrupt acknowledge through the output line 12. This acknowledge is routed by the interrupt controller 40 back to peripheral 1 via line 121. The interrupt acknowledge signals peripheral 1 to get its interrupt vector ready on the data bus. Thereafter, the CPU issues a read* strobe via line 31 and the trailing edge of which is used to latch the interrupt vector from the bus.

As discussed earlier, the timing specification is such that the length of the interrupt acknowledge cycle must be longer than the vector ready time, which is T1 for peripheral 1. In the cases where the interrupt acknowledged cycle timing is such that the trailing edge of the read* strobe occurs prior to the interrupt vector being ready, a watchdog external logic 50 is used to insert a number of wait states in the CPU to delay the read* strobe. The watchdog external logic 50 monitors the interrupt lines 11 and 12 of the CPU and asserts a WAIT FOR VECTOR signal through a line 55 for a predetermined number of clock cycles. The watchdog external logic 50 derives its clock signal from the CPU via a line 51. The WAIT FOR VECTOR signal, when asserted through an OR gate 60 and an input line 65 to the WAIT pin of the CPU, suspends the operation of the CPU. In this way, the length of the interrupt acknowledge cycle can be lengthened to satisfy the timing specification.

In the case where T2, the vector ready time of peripheral 2, is longer than that of T1, the vector ready time of peripheral 1, the watchdog external logic 50 must be adjusted to put in more wait states so that the interrupt acknowledge cycle timing is commensurate with T2. In this way, the timing specification is satisfied for both peripheral 1 and peripheral 2. As noted earlier, this worst-case setting compromises the performance of the faster peripheral 1.

Attention is now turned to the USC peripheral 3 300 in which the various aspects of the present invention is embodied in an interrupt acknowledge circuit 400.

The interrupt acknowledge circuit 400 serves to customize the timing specification of the interrupt acknowledge cycle of the CPU to that of the USC peripheral. Essentially, the interrupt acknowledge circuit 400 puts out an active IVACK signal along an output line 405 as soon as it senses the leading edge of the read* strobe sent from the CPU. The active IVACK signal goes through OR gate 60 to the WAIT input line 65 to to suspend the CPU's operation. It is asserted for a predetermined period, so that by the time the CPU releases the trailing edge of the READ* strobe, the USC peripheral 300 will have already put out a valid interrupt vector on the bus 20.

The description, so far, has been directed to CPU's having a WAIT input. Other CPU's have a READY input line 65 instead. In this case, as soon as the leading edge of the READ* strobe is released, the CPU automatically goes into suspension until re-activated by an active READY. In the preferred embodiment, the interrupt acknowledge circuit 400 supports both type of inputs to the CPU by having an input line 403 responsive to a READY/WAIT* bit. This bit comes from an internal register of the USC peripheral. Thus, the case with the WAIT input is selected by setting the READY/WAIT* bit to a Zero and, the case with the READY input is selected by setting the READY/WAIT* bit to a One. The IVACK signal output on line 405 will be different for the two cases and will be distingushed by the notations, IVACK(W) and IVACK(R) respectively.

The invention described is advantageous in that the interrupt acknowledge cycle timing is customized to the USC peripheral. If the USC peripheral is a serial port with many interrupt sources, its vector ready time T3 is necessarily long. When a USC peripheral is added to a system with existing faster peripherals, for example, there is no need to lengthen the delay in the watchdog external logic 50 to accomodate it at the expense of the others. Another advantage is that the timing specifications are automatically met when using the USC peripheral, eliminating another possible system design error.

FIG. 2 is the circuit diagram for the interrupt acknowledge circuit 400 illustrated in FIG. 1. It is best understood in conjunction with the timing diagrams of FIGS. 3(A)-3(G).

Consider first the case where the circuit 400 is interfaced with a CPU having a WAIT input. Thus, the input READY/WAIT* line is set Low. The delay circuit 500 is such that, initially, its VECTOR VALID output 505 is inactive Low (see FIG. 3(D)). Thus, the output of the OR gate 410 is Low. This in turn turns off the NAND gate 420 to make its output 425 High.

When an interrupt is requested, the input INT line 311 becomes active High (see FIG. 3(A)) and it effectively turns the NAND gate 430 into an inverter. Shortly afterwards, the CPU returns with an interrupt acknowledge and therefore the input INTACK line 321 becomes active High (see FIG. 3(B)). This effectively turns the NAND gate 440 into an inverter for the other input 425. Recalling the line 425 is already High, and it gets inverted to a Low when it emerges out of the line 445 and effectively turns the NOR gate 450 into an inverter.

Shortly, after the CPU has issued the interrupt acknowledge, it issues the leading edge of the READ* strobe (see FIG. 3(C)). Thus, an active Low appears at the input READ* line 31. This signal propagates down two paths. In one path it is inverted thrice by inverter 460, NAND gate 430 and NOR gate 450 respectively before emerging as an active High signal in the name of IVACK(W) on the output line 405 (see FIG. 3(E)). This signal is used to suspend the operation of the CPU. In this way, the issuing of the trailing edge of the READ* strobe is deferred. (The signal illustrated in broken lines in FIG. 3(C) represents the timing of the trailing edge if there were no delays).

In another path, the active Low READ* signal starts a clock within the delay circuit 500. After a predetermined period of time such that a valid interrupt vector becomes available on the bus (see FIG. 3(D) and 3(G)), the delay circuit 500 makes the VECTOR VALID output 505 active High (see FIG. 3(D)). This causes the output of the OR gate 410 and the NAND gate 470 High and therefore the line 425 Low. This, in turn, gets inverted twice by NAND gate 440 and NOR gate 450 to turn off the IVACK(W) signal on line 405 to an inactive Low (see FIG. 3(E)). When this happens, the CPU is re-activated and shortly thereafter releases the trailing edge of the READ* strobe to latch the now valid interrupt vector from the bus (see FIG. 3(C) and 3(G)).

For the case when the peripheral is interfaced to a CPU with a READY input, the input READY/WAIT* line is High. The analysis proceeds along similar lines as earlier, except, in this case, the line 425 is Low when the line VECTOR VALID is Low and vice versa. As a Low in line 425 effectively turns off the output of the NOR gate 450, the output IVACK(R) line 405 is initially at inactive Low (See FIG. 3(F)). When the VECTOR VALID line 505 becomes High, so does the line 425 and it effectively turns the NOR gate 450 into an inverter. Thus, the active Low READ* signal on the input line 31 is inverted thrice via the inverter 460, the NAND gate 430 and the NOR gate 450 to become an active High signal in the name of IVACK(R) on the output line 405 (see FIG. 3(F)). This signal is sent to the READY input line of the CPU to reactivate the CPU as before. Shortly thereafter, the CPU releases the trailing edge of the READ* strobe to latch the now valid interrupt vector from the bus (see FIG. 3(C) and FIG. 3(G)). When the trailing edge is issued, the READ* input line 31 becomes inactive High and its signal propagates to the output line 405 to return the IVACK(R) signal to inactive Low (see FIG. 3(C) and FIG. 3(F)).

FIG. 4 is a detailed circuit diagram of the delay circuit 500 illustrated in FIG. 2. Essentially, it functions to delay the READ* strobe on the input line 31 by clocking it through a series of daisy-chained flip-flops 510, 520 and 530. The clock is provided by an analogue gated oscillator circuit 600. In considering FIG. 4, the corresponding timing diagrams shown in FIGS. 5(A-)-5(H) are referred to at the same time.

When the input READ* line 31 becomes active Low (see FIG. 5(B)), the output of an inverter 502 becomes High. The High state in line 503 then gets propagated down three paths. In the first path, it enables an output AND gate 540. In the second path, it passes through an AND gate 504 to become the GATE input 507 (see FIG. 5(C)) of the gated oscillator circuit 600. The AND gate 504 has previously been enabled by the input INTACK line 321 being active High (see FIG. 5(A)). As will be described later, the active High GATE input 507 induces the oscillator circuit 600 to produce a clock output at line 601 (see FIG. 5(D)) which is used to clock the flip-flops 510, 520 and 530. In the third path, the High state in line 503 is clocked through the three daisy-chained flip-flops resulting in a delay by three clock periods (see FIGS. 5(E)-5(G)) as it emerges out of the enabled AND gate 540 to become the VECTOR VALID signal in the output line 505 (see FIG. 5(H)). Thus, the delay may be adjusted by varying the number of flip-flops in the daisy chain.

Referring to the gated oscillator circuit 600 in FIG. 4, the description of which will be with reference to the timing diagrams of FIGS. 6(A)-6(E). Initially, the input GATE line 507 is inactive Low (see FIG. 6(A)), and the state is propagated down two paths. In the first path, it turns on a p-transistor 610 which forces the node N3 in the line 613 to the High voltage of VDD (see FIG. 6(D)). This High state after being driven by a pair of buffers 620, 630 appears at the CLK output line 601 (FIG. 6(E)). This CLK output will remain High until an active High GATE input state in line 507 turns off the p-transistor 610 (see FIG. 6(A)). When that happens, the active High GATE input passes down the second path, through the AND gate 640 enabled by the feedback of the initially High CLK output 601 to appear at a node N1 (see FIG. 6(B)). Then it gets driven by an inverting buffer 650 to the next node N2 (see FIG. 6(C)) where it encounters the RC circuit given by a resistor 660 and a capacitor 680. This results in the discharge of the capacitor 680 and the originally High state at the node N3 transits to a Low state in the line 613 (see FIG. 6(D)). This is then driven by a pair of buffers 620, 630 to appear as a Low state at the CLK output line 601 (see FIG. 6(E)).

The feedback of the Low CLK line 601 also disables the AND gate 640. This results in a Low state appearing at the node N1 and a High state at the node N2 (see FIGS. 6(B)-6(C)). The capacitor 680 then gets charged up and the currently Low state at the node N3 transits to a High state in the line 613 (see FIG. 6(D)). This results in a High state appearing again at the CLK output line 601 (see FIG. 6(E)). This iteration continues and results in a series of clock pulses at the CLK output line 61 as required, until turned off by the GATE input line 507 going inactive Low.

Thus, another way of adjusting the timing of the delay circuit 500 is to adjusting the analogue RC constant of the circuit.

Although the various aspects of the present invention have been described with respect to its preferred embodiment, it will be understood that the invention is to be protected within the scope of the appended claims.

It is claimed:

1. A computer peripheral chip compatible with Central Processing Units (CPU's) operating with different clock speeds, said peripheral connected through a system but with a CPU timed by a CPU clock, wherein an interrupt acknowledge cycle takes place by the CPU issuing an interrupt acknowledge signal followed by a leading edge of a read signal to the peripheral resulting in the peripheral putting a valid interrupt vector on the system but after a first period of time relative to the leading edge of the read signal, and the CPU issuing a trailing edge of the read signal after a second period of time relative to the leading edge of the read signal, said trailing edge being used to read the interrupt vector from the system bus, the improvement including a device within the peripheral chip which allows a valid interrupt vector to be read under different CPU clock speeds, comprising:

an analog RC circuit for providing a peripheral clock signal independent of the CPU clock;

a plurality of daisy-chained flip-flops for clocking the peripheral clock signal therethrough in order to slow down the peripheral clock signal to have a period equal to a predetermined duration of time, said predetermined duration of time being use to extend the second period of time beyond the first period of time; and means responsive to the leading edge of the read signal for asserting a control signal therefrom to suspend the operation of the CPU for said predetermined duration of time, thereby extending said second period of time until it is greater than said first period of time such that a valid interrupt vector is read by the CPU.

2. A computer peripheral chip compatible with Central Processing Units (CPU's) operating with different clock speeds, said peripheral connected through a system bus with a CPU timed by a CPU clock, wherein an interrupt acknowledge cycle takes place by the CPU issuing an interrupt acknowledge signal followed by a leading edge of a read signal to the peripheral resulting in the peripheral putting a valid interrupt vector on the system bus after a first period of time relative to the leading edge of the read signal, and the CPU suspending the operation of the CPU from the leading edge of the read signal until re-activated by the assertion of a control signal to resume issuing of a trailing edge of the read signal after a second period of time relative to the leading edge of the read signal, said trailing edge being used to read the interrupt vector from the system but, the improvement including a device within the peripheral chip which allows a valid interrupt vector to be read under different CPU clock speeds, comprising:

an analog RC circuit for providing a peripheral clock signal independent of the CPU clock;

a plurality of daisy-chained flip-flops for clocking the peripheral clock signal therethrough in order to slow down the peripheral clock signal to have a period equal to a predetermined duration of time, said predetermined duration of time being use to extend the second period of time beyond the first period of time; and means responsive to the leading edge of the read signal for starting the predetermined duration of time therefrom and for asserting a control signal at the end of the predetermined duration of time to re-activate the CPU, thereby extending said second period of time until it is greater than said first period of time such that a valid interrupt vector is read by the CPU.

* * * * *

UNITED STATES PATENT AND TRADEMARK OFFICE
CERTIFICATE OF CORRECTION

PATENT NO.    : 5,032,982
DATED         : JULY 16, 1991
INVENTOR(S)   : MONTE J. DALRYMPLE; DON SMITH

It is certified that error appears in the above-identified patent and that said Letters Patent is hereby corrected as shown below:

Column 7, line 27, in Claim 1:    replace "but" with --bus--

Column 7, line 32, in Claim 1:    replace "but" with --bus--

Column 8, line 25, in Claim 2:    replace "but" with --bus--

Signed and Sealed this

Eighth Day of December, 1992

Attest:

DOUGLAS B. COMER

Attesting Officer    Acting Commissioner of Patents and Trademarks